(12) United States Patent
Reed (10) Patent No.: US 11,791,503 B2
(45) Date of Patent: Oct. 17, 2023

(54) METHOD OF CHARACTERIZING AND MONITORING ENERGY USAGE OF BATTERY POWERED WIRELESSLY LINKED DEVICES

(71) Applicant: Flowserve Pte. Ltd., Singapore (SG)

(72) Inventor: Stewart D. Reed, Spring, TX (US)

(73) Assignee: Flowserve Pte. Ltd., Singapore (SG)

( * ) Notice: Subject to any disclaimer, the term of this patent is extended or adjusted under 35 U.S.C. 154(b) by 169 days.

(21) Appl. No.: 17/380,901

(22) Filed: Jul. 20, 2021

(65) Prior Publication Data

US 2023/0028436 A1    Jan. 26, 2023

(51) Int. Cl.
*H01M 10/42* (2006.01)
*H01M 10/48* (2006.01)

(52) U.S. Cl.
CPC ....... *H01M 10/4257* (2013.01); *H01M 10/48* (2013.01); *H01M 2010/4271* (2013.01); *H01M 2010/4278* (2013.01)

(58) Field of Classification Search
CPC ............. H01M 10/4257; H01M 10/48; H01M 2010/4271; H01M 2010/4278
See application file for complete search history.

(56) References Cited

U.S. PATENT DOCUMENTS

| | | | |
|---|---|---|---|
| 7,960,047 B2 | 7/2011 | Berg | |
| 8,773,076 B2 | 7/2014 | Choi et al. | |
| 2011/0185196 A1 | 7/2011 | Asano | |
| 2011/0248678 A1 | 10/2011 | Wade et al. | |
| 2019/0033395 A1* | 1/2019 | Karner | ............. G06Q 10/06315 |
| 2019/0126076 A1* | 5/2019 | Mclaughlin | ............... A62B 7/00 |
| 2019/0212397 A1* | 7/2019 | Yamada | ............. G01R 31/3648 |
| 2020/0217901 A1* | 7/2020 | Sugiyama | ............ H02J 7/00036 |
| 2020/0284843 A1* | 9/2020 | Feltham | ............ H01M 10/4257 |
| 2020/0393516 A1* | 12/2020 | Gao | ...................... H02J 7/0048 |

FOREIGN PATENT DOCUMENTS

| | | |
|---|---|---|
| KR | 1020100004561 A | 1/2010 |
| KR | 101467170 B1 | 12/2014 |
| KR | 1020160028946 A | 3/2016 |

OTHER PUBLICATIONS

International Search Report and Written Opinion for PCT Appl. No. PCT/US2022/033628 dated Oct. 6, 2022, 13 pages.

* cited by examiner

*Primary Examiner* — Scott J. Chmielecki
(74) *Attorney, Agent, or Firm* — Maine Cernota & Rardin (57) ABSTRACT

A method of managing a battery of a wireless sensor or other battery-powered remote wireless device includes pre-characterizing the device's energy usage during its various activities and modes, placing the device in operation, opportunistically gathering device operational data obtained for purposes other than battery management, and estimating a status of the battery according to an analysis of the operational data in light of the pre-characterized information. The method further includes taking a battery management action according to the estimated battery status, such as recharging or replacing the battery when it is nearly exhausted, and/or modifying the operation of the device so as to extend the battery lifetime, for example by reducing or increasing the frequency of data transmissions, measurements, calculations, and/or other dynamic current events. The status estimate can further be in light of measurements provided by a simple current measuring circuit included in the device.

22 Claims, 7 Drawing Sheets

METHOD OF CHARACTERIZING AND MONITORING ENERGY USAGE OF BATTERY POWERED WIRELESSLY LINKED DEVICES

FIELD OF THE INVENTION

The invention relates to battery powered wireless devices, and more particularly, to methods of monitoring energy usage, estimating remaining battery life, optimizing battery management, and extending the battery lifetime of battery powered wireless devices.

BACKGROUND OF THE INVENTION

Battery powered, wirelessly linked devices have long been used for a very diverse range of applications, including portable communication devices such as pagers and cellular telephones, remote sensing devices, devices that track valuable assets, and security applications such as monitoring commercial premises and identifying suspicious activity. Banks can turn wireless push buttons into panic buttons for employees, and retailers can install wireless window sensors on every building access point. Homeowners can also use wireless air sensors to detect harmful gases in the air, such as carbon monoxide.

Battery powered wireless sensors in particular can be used to anticipate, detect, and/or mitigate current or future problems that might arise in various types of apparatus. For example, wireless rope sensors can be used in server rooms and data centers to detect the presence of water near computer hardware, water leak sensors can be mounted on walls to detect plumbing failures or pipes that may burst in the winter, and wireless sensors that monitor vibration, temperature, noise, pressure, and/or other environmental factors can be used in oil refineries, factories, utilities, and other large facilities to detect problems and failures in pumps, valves, and other mission-critical apparatus.

In some cases, a battery powered wireless sensor or other device may be implemented in a hazard-rated area, such that use of a primary, i.e. non-rechargeable, battery is preferred over using a rechargeable battery due to safety considerations. In the petroleum industry, wireless sensors are sometimes used for "down-hole" monitoring of a well, and are thereby subjected to a wide range of temperatures and pressures.

The choice to implement wireless sensors and/or other wireless devices, instead of comparable apparatus that derives power from and/or communicates over wires, becomes increasingly attractive when ease of installation is desirable. In particular, it can be strongly preferable to install a large number of wireless sensors to monitor equipment throughout a major facility, such as a large factory, utility, or oil refinery, because the sensors can be implemented without any need to install an extensive power network and/or data network throughout the facility. Furthermore, the ease of installation of wireless devices can make them ideal for installation in a hazardous area.

It can sometimes be important to monitor the data communication patterns and other activities of a wireless device so as to detect excess data collisions and/or other problems that might reduce the performance of the wireless device and/or network. For example, a log can be maintained by a wireless device of the lengths and frequency of its wireless transmissions, including re-transmissions due to network collisions and other failures. Such data can then be retrieved using a wired connection during a battery exchange or other servicing event, upon a remote command or non-periodic trigger event via a wireless data transmission, or periodically retrieved via wireless data transmissions.

The utility of wireless sensors and many other wireless devices has been greatly increased by their integration into the Internet of Things (IoT), which provides protocols for low energy, low data rate wireless transmissions over very long distances, and also by the development of low power wide area network (LPWAN) protocols such as LoRaWAN, SigFox, and NB-IoT. Together with improved battery technology, these advances in low power communication have helped to increase the battery life of wireless battery-powered devices, thereby decreasing the frequency with which the batteries must be recharged or exchanged.

Nevertheless, for most types of battery powered wireless devices it remains desirable to extend the battery lifetime as much as possible. For this reason, wireless sensors and other wireless devices often minimize total power consumption and maximize battery life by alternating between low-power or minimal power "sleep periods" and fully powered "active" periods. As used herein, the term "active" period refers to a period when the wireless device is performing tasks such as collecting data, sensing, taking measurements calculating, and interpreting. Typically, during an active cycle the device may experience "dynamic current" events that require bursts of current and energy usage, such as transmitting messages over a wireless network. A "sleep" period refers to a period when most or all of the device has been turned off, or intentionally put into a state where the power consumption is much less than during an "active" period. A "wake/sleep cycle" refers, in aggregate, to an active period followed by a sleep period, or vice versa.

Many wireless sensors and other wireless devices also have the ability to enter one or more partial sleep "modes" wherein energy usage is significantly reduced, but some low-power activities can still be executed. For example, a device may be set to a comparatively low power partial sleep mode that allows monitoring of an I/O pin connected to a sensing device or circuit. Upon an event where a breach of an electric threshold on the I/O pin is detected, the device may wake from the lower power partial sleep mode to a higher power sleep mode where more energy consuming activity is allowed. A transition from a lower power sleep mode to a higher power sleep mode is also considered a transition from a "sleep" state to an "active" state.

Often, the durations of the active and/or sleep periods of a wireless device are variable. In some cases, the timing of the wake/sleep cycles is automatically adapted, for example if a battery powered wireless sensor senses an anomaly and automatically changes the sequence and types of cycles that are performed so as to more closely monitor the anomaly. In other cases, operational changes, such as changes to the data transmission intervals, are made by an end-user. Even if the wake/sleep cycle timing of a wireless device is rigidly defined, the amount of energy that is consumed during each active period can vary, for example if there is an increase in the number of dynamic current events resulting from re-transmissions of packets due to network collisions. For all of these reasons, it can be difficult to remotely estimate how much energy remains in the battery at any given time, and to predict when the device will likely require recharging or replacement.

Many, if not most, wireless devices of all types include some form of battery level indication. In some cases, a set of bars is displayed that decrease in number as the battery is discharged, or a numerical display of the remaining battery life is provided as a percentage. In larger installations, where frequent, direct observation of battery indicators is not convenient, a battery life indication can sometimes be remotely monitored.

Most battery powered wireless systems base their battery life indications on measurements of the voltage level of the battery. Many establish a simple voltage threshold to trigger an alert and notify an end-user when a battery needs to be recharged or replaced. However, this approach is highly inaccurate, because of the flat voltage discharge profiles of lithium-based and other battery chemistries. In other words, changes in the battery voltage are minimal until the battery is almost fully discharged. This approach also ignores the significance of a battery's performance trend under load, i.e. during active periods, vs. during sleep periods, in that the battery voltage will typically vary depending on how much current is being drawn. Furthermore, if a voltage alert is issued by a wireless sensor only when a battery is nearly discharged, the result can be a battery "crisis," in that it may be inconvenient and/or expensive to recharge or replace the battery before the wireless sensor shuts down completely. If that happens, measured data may be lost, and an end-user will receive no further information regarding the status of the apparatus that is being monitored by the wireless sensor until the battery can be recharged or replaced.

Of course, additional dedicated circuitry, such as power metering circuitry, can be added to a wireless device to monitor the energy that is drawn from the battery, but this approach increases the cost, complexity, and potential failure modes of the device, consumes additional battery power, and requires that the device be increased in size, so that additional hardware can be incorporated within the device.

What is needed, therefore, is a reliable and accurate method for remotely monitoring the battery usage of a wireless device, and for predicting its remaining battery life, while minimizing or eliminating any requirement to implement additional monitoring hardware, and with little or no additional energy expenditure, so that the full capacity of the battery can be utilized while ensuring that the battery can be exchanged or replaced at a convenient time before it is completely exhausted.

SUMMARY OF THE INVENTION

The present invention is a reliable and accurate method for remotely estimating the battery status of a wireless device, predicting its remaining battery life, and providing battery management while minimizing or completely avoiding any implementation of additional monitoring hardware, and requiring little if any additional energy expenditure, so that the full capacity of the battery can be utilized, while ensuring that the battery can be exchanged or replaced at a convenient time before it is completely exhausted.

More specifically, the present invention estimates battery usage and remaining battery life by taking opportunistic advantage of information that is already being collected for other purposes, and thereby minimizes or eliminates any need for additional measurements and/or communications that are specifically implemented for battery management purposes.

According to the disclosed method, pre-characterized information is obtained regarding the wireless device. The pre-characterized information can include power consumption of the wireless device during each of its various activity modes. The pre-characterized information can further include historical, statistical data gleaned from observations of a plurality of batteries or devices of a similar or identical type, such as the average sensitivity of such batteries or devices to temperature, pressure, and/or other environmental conditions, passivation behavior of the batteries, battery chemistry life profiles, etc. The historical data can also include information regarding a history of the wireless device itself, such as how long the device will have been in storage, or the battery will otherwise have been idle, before the device is put into service.

In embodiments, analysis of the pre-characterized information further includes developing one or more statistical models of battery life derived from the historical data, for example a statistical model that correlates the battery life with the density of sensors or other devices in various environments, or a model that correlates passivation with environmental factors and usage patterns. In various embodiments, analysis of the pre-characterized information includes using the pre-characterized information to train an artificial intelligence/machine learning algorithm, for subsequent use in analyzing observations of the device while it is in service.

Once the device is put into service, operational data that is being gathered for other purposes is opportunistically monitored, analyzed, and used in combination with the pre-characterized information to make periodic estimates of a total amount of power that has been consumed since the last recharge or replacement of the battery. In embodiments, at least some of the operational data is combined with the pre-characterized information for use in making subsequent estimates. In various embodiments, analysis of the opportunistically monitored operational data includes application of a machine learning/AI algorithm to the operational data, where the algorithm is "taught" using the historical data as described above and/or using observations of the device while it is in service. For example, based on the historical information, the machine learning algorithm may detect a correlation between environmental conditions, lengths of sleep periods, and passivation behavior of the battery, and then apply that correlation to help in predicting passivation behavior of the device that is currently being monitored.

As used herein, the term "monitored operational data" refers to data that are collected regarding the activities and status of a wireless device for purposes unrelated to battery life monitoring. Accordingly, use of this information to also estimate battery energy consumption is referred to herein as "opportunistic." Examples of opportunistically monitored operational data of a wirelessly linked device include, in embodiments:

lengths of wake/sleep cycles (including lengths and types of any partial sleep periods);
lengths and number of active periods;
number and durations of dynamic electric current events during active periods;
number of packets transmitted during an active period;
frequency of sleep-to-wake cycles;
number of measurements made;
number of calculations performed;
internal and/or adjacent environmental temperature and/or pressure profile; and
transient behavior of the battery voltage during application and/or removal of a load.

While some embodiments derive their power and battery life estimates solely based on an analysis of the pre-characterized information and monitored operational data, other embodiments further refine these estimates by implementing a simple, low cost, low-profile, and low energy circuit in the wireless device, such as a current measurement circuit that is able to measure and report current flow during dynamic current events.

In some embodiments, a voltage sensor is implemented in the device that measures the voltage of the battery, the device monitors and reports the "start-up" load behavior of the battery voltage, i.e. the temporary drop in voltage and the recovery of the voltage that occurs immediately after the battery is subjected to a load at the beginning of an active period or during a dynamic current event such as a radio transmission. Similarly, in embodiments the device monitors and reports the behavior of the battery voltage when there is a sudden drop in energy consumption, for example due to a transition from an active period to a sleep period.

The disclosed method further includes battery management, whereby the power and battery life estimates, and in embodiments also the predicted battery passivation behavior, are used to schedule recharging or replacement of the battery comfortably, but not excessively, before its energy is exhausted. In some embodiments, if excessive energy consumption is detected, or environmental conditions that are prone to accelerate battery death are detected, the method further includes reducing the rate of battery power consumption by increasing the lengths of the sleep periods and/or reducing the number of dynamic current events that are required during each active period.

In embodiments, the battery management can further include minimization of battery passivation issues where un-managed passivation of a battery could shorten the battery life. For example, if energy is drawn from the battery too infrequently, this could allow a large passivation layer to accrue within the battery, and thereby cause the battery to fail to provide sufficient dynamic power to operate the wireless sensor. In these embodiments, if an analysis of the pre-characterized and opportunistically monitored operational data indicates that current needs to be drawn from the battery more frequently, the battery management can include increasing the frequency of active periods and/or dynamic current events.

The present invention is a method of managing a remote, wireless device that is powered by a battery. The method includes:

A) obtaining pre-characterized information pertaining to the wireless device, wherein said pre-characterized information includes identifying substantially all of the operational phases and/or activities that characterize operation of the device, and determining a quantity of energy drawn from the battery during each of said phases and/or activities;
B) placing the wireless device in service;
C) receiving operational data pertaining to actual phases and/or activities of the wireless device while it is in service, said operational data being "opportunistic," in that it is obtained for purposes unrelated to battery management;
D) analyzing the opportunistic operational data in light of the pre-characterized information;
E) according to the analysis of step D), estimating a status of the battery, the estimated status including an estimated total energy consumed by the battery since it was last recharged or replaced;
F) repeating steps C) through E) during a period of operation of the remote wireless device; and
G) taking a battery management action based on the estimated status of the battery.

In embodiments, the remote wireless device is a remote wireless sensor.

In any of the above embodiments, the remote wireless device can be configured to cycle between at least one active mode and at least one sleep mode, and the pre-characterized information can include, for each of the active and sleep modes, an energy usage profile of the active or sleep mode.

In any of the above embodiments, the pre-characterized information can include energy usage associated with a dynamic current event during which a relatively high amount of current is drawn from the battery as compared to lower amounts of current that are drawn from the battery during most of the other operational phases and activities of the remote wireless device.

In any of the above embodiments, the pre-characterized information can include at least one of: historical data regarding the wireless device; historical data regarding battery usage and/or behavior of similar or identical batteries and/or devices; information regarding an estimated total battery idle time that will elapse before the device is put into service; and after steps C) through E) have been performed at least once, combining information derived from any of steps C) through E) with the pre-characterized information.

In any of the above embodiments, the method can further include analyzing the pre-characterized information. In some of these embodiments, the pre-characterized information includes historical data regarding the wireless device, and step D) includes at least one of: developing a statistical model of battery life according to the historical data; developing a statistical model of battery passivation according to the historical data; and using the historical data to train a machine learning/artificial intelligence algorithm.

In some of these embodiments, at least one of the statistical model of battery life, the statistical model of battery passivation, and the training of the machine learning/artificial intelligence is periodically or continuously updated after step B) in light of the opportunistic operational data. In any of these embodiments, step E) can include applying at least one of the statistical model and the machine leaning/artificial intelligence algorithm to the opportunistic operational data.

In any of the above embodiments, the opportunistic operational data can include durations and numbers of active and sleep periods entered by the remote wireless device.

In any of the above embodiments, the opportunistic operational data can include a number of dynamic current events that have occurred. In some of these embodiments, the dynamic current events include wireless transmissions by the remote wireless device. In any of these embodiments, the remote wireless device can be a wireless sensor, and the dynamic current events can include measurements made by the wireless sensor and/or calculations performed by the wireless sensor.

In any of the above embodiments, the opportunistic operational data can include a quantity of information wirelessly retransmitted by the remote wireless device.

In any of the above embodiments, at least some of the opportunistic operational data can be obtained in support of management of the network.

In any of the above embodiments, at least some of the opportunistic operational data can be obtained due to remote management of the wireless device.

In any of the above embodiments, the remote wireless device can be a remote wireless sensor, and at least some of the opportunistic operational data can be obtained due to reporting by the remote wireless sensor of data that it has sensed.

In any of the above embodiments, the opportunistic operational data can further include environmental information pertaining to at least one of an interior of the remote wireless device and an immediate environment of the remote wireless device.

In any of the above embodiments, estimating the total energy consumed by the battery since it was last recharged or replaced cam be further according to current measurement data obtained by a current measuring circuit included in the remote wireless device.

In any of the above embodiments, estimating the status of the battery can further include analyzing transient behavior of the battery voltage during application and/or removal of a load according to transient voltage measurements obtained by a voltage measuring circuit included in the remote wireless device.

In any of the above embodiments, the estimated status of the battery can further include an estimate of a degree of passivation of the battery.

In any of the above embodiments, the battery management action of step F) can include at least one of recharging or replacing the battery when said energy consumption estimates indicate that the battery is nearly exhausted, decreasing a degree of device activity so as to reduce energy consumption of the device, increasing the degree of device activity so as to reduce passivation of the battery, increasing the degree of device activity so as to avoid excessive cooling of the battery, decreasing the degree of device activity so as to avoid excessive heating of the battery, and adjusting a temperature control device that is proximate but independent of the wireless device so as to avoid excessive cooling or heating of the battery.

In still other embodiments, when it is determined that the environmental temperature proximate the wireless device is falling below a specified minimum or rising above a specified maximum, the battery management includes taking steps to increase or decrease the device temperature. This can be by increasing or decreasing the rate of activity of the device, so that the heat generated by the device itself is increased or decreased. In some embodiments, if an external heater or other climate control is available, the battery management can include causing the climate control to activate or to increase its rate of heating or cooling.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present invention is a reliable and accurate method for remotely estimating the battery status of a wireless device, predicting its remaining battery life, and providing battery management while minimizing or completely avoiding any implementation of additional monitoring hardware, and requiring little if any additional energy expenditure, so that the full capacity of the battery can be utilized, while ensuring that the battery can be exchanged or replaced at a convenient time before it is completely exhausted.

Figure 1:
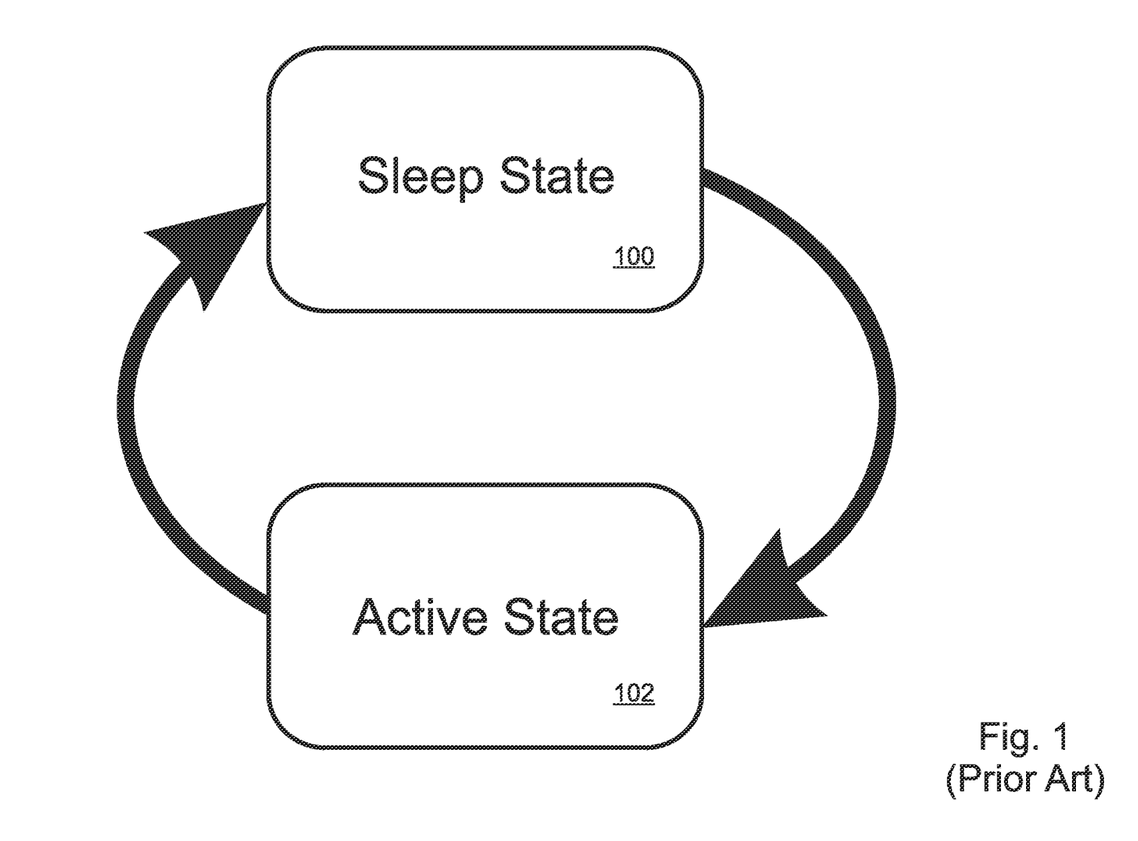
FIG. 1 illustrates a typical awake/sleep cycle of a prior art remote wireless device.
Figure 2A:
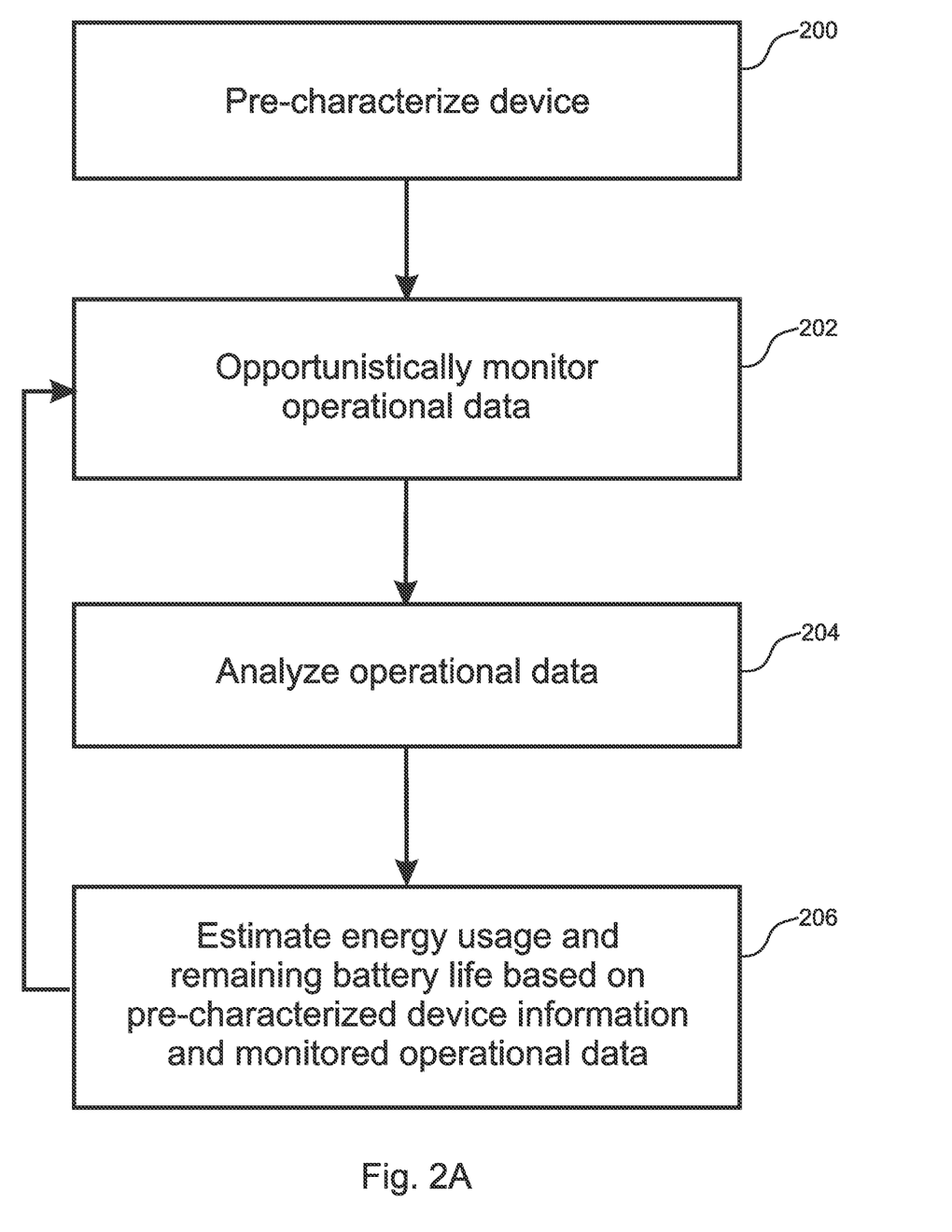
FIG. 2A is a flow diagram that illustrates the steps of the present invention in an embodiment thereof.
Figure 2B:
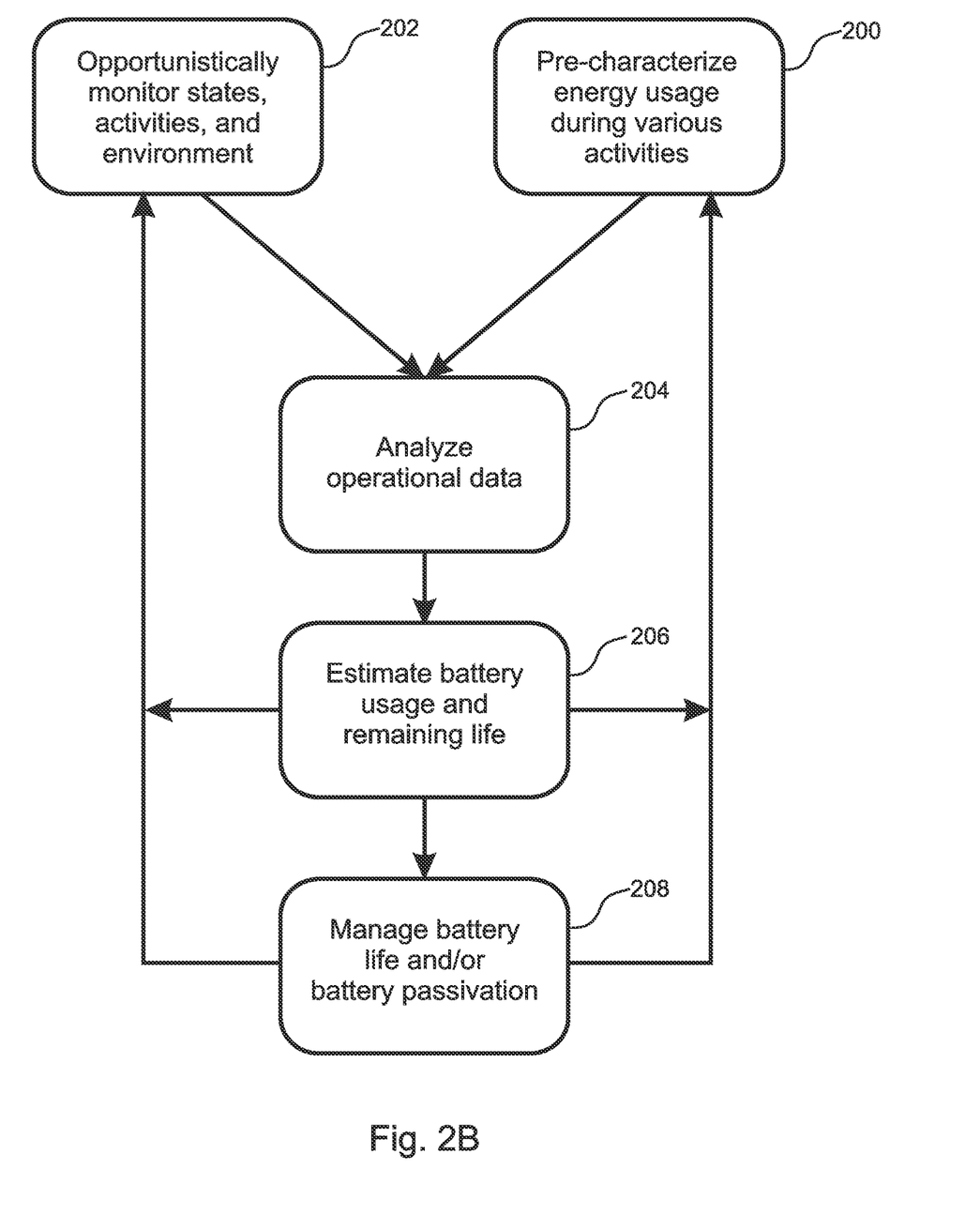
FIG. 2B is a block diagram that illustrates the steps of FIG. 2A, indicating how the pre-characterized information and opportunistic operational data are combined when estimating a total energy usage of the battery.

With reference to FIGS. 2A and 2B, according to the present invention the wireless device is pre-characterized 200, after which operational data is opportunistically monitored 202 and periodically analyzed 204, and battery management is implemented 206. This process is repeated periodically during the lifetime of the battery. As is indicated in FIG. 2B, in embodiments information derived from the estimates 206 and battery management 208 is combined with the pre-characterized information for use in subsequent analysis 204.

Figure 2C:
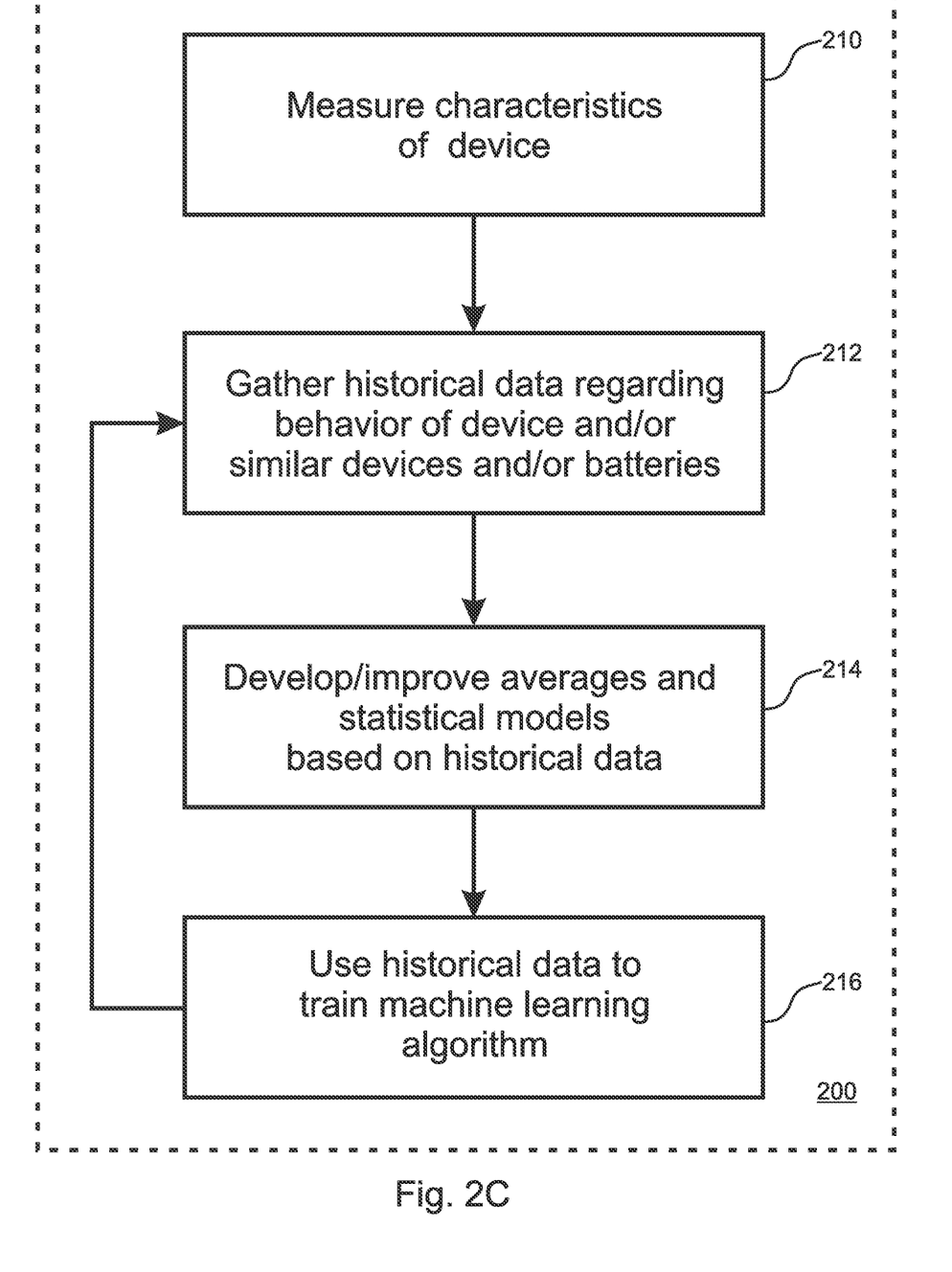
FIG. 2C is a block diagram that illustrates steps that are included in embodiments as part of the pre-characterizing of FIG. 2B.

With reference to FIG. 2C, the pre-characterization 200 can include measurement of characteristics of the device itself 210, for example determining energy usage profiles during wake periods 102 and during various partial and full sleep periods 100. In embodiments, if the power consumption during active periods 102 and during the various partial and full sleep periods 100 is relatively consistent, the pre-characterization is accomplished by determining power consumption profiles during the active periods 102 and sleep periods 100.

In other embodiments, specific tasks that can be performed during active periods 102, including dynamic current events, are identified and individually pre-characterized 200 in terms of their energy consumption. For example, energy usage can be pre-characterized when the device is making measurements, performing calculations, and/or wirelessly transmitting data.

With continuing reference to FIG. 2C, in addition to measuring characteristics of the device itself 210, the pre-characterization can further include gathering and analyzing historical, statistical data 212 gleaned from previous observations of a plurality of batteries or devices of a similar or identical type, such as the average sensitivity of such batteries or devices to environmental conditions such as temperature and/or pressure, average passivation behavior of the battery, battery chemistry life profile, etc. The historical data can also include information regarding a history of the device itself, such as how long the device will have been in storage, or the battery will otherwise have been idle, before the device is put into service. In embodiments, ongoing data regarding the operation of the device is combined with the historical data 212 for use in subsequent estimation, Analysis of the pre-characterized information can further include developing one or more statistical models 214 of battery life and/or battery passivation derived from the historical data, for example a statistical model that correlates the battery life with the density of sensors or other devices in various environments, or a model that correlates passivation with environmental factors and usage patterns. In various embodiments, the pre-characterization 200 includes using the historical data to train an artificial intelligence/ machine learning algorithm 216, for subsequent use in analyzing the opportunistic operational data that is obtained once the wireless device is in service.

Once the device is put into service, the present invention opportunistically monitors 202 operational data that is already being collected from the device for unrelated purposes, and combines the pre-characterized information with the opportunistically monitored operational data to estimate the status of the battery, which can include estimating a total energy consumed since the last recharge or replacement of the battery, the passivation of the device, and the remaining battery life of the device 206. These steps of opportunistically monitoring and estimating are repeated indefinitely.

As used herein, the term "monitored operational data" refers to data that are collected regarding the activities and status of a wireless device for purposes unrelated to estimating energy consumption and remaining battery life. Accordingly, use of this information to also estimate battery energy consumption is referred to herein as "opportunistic."

Figure 3:
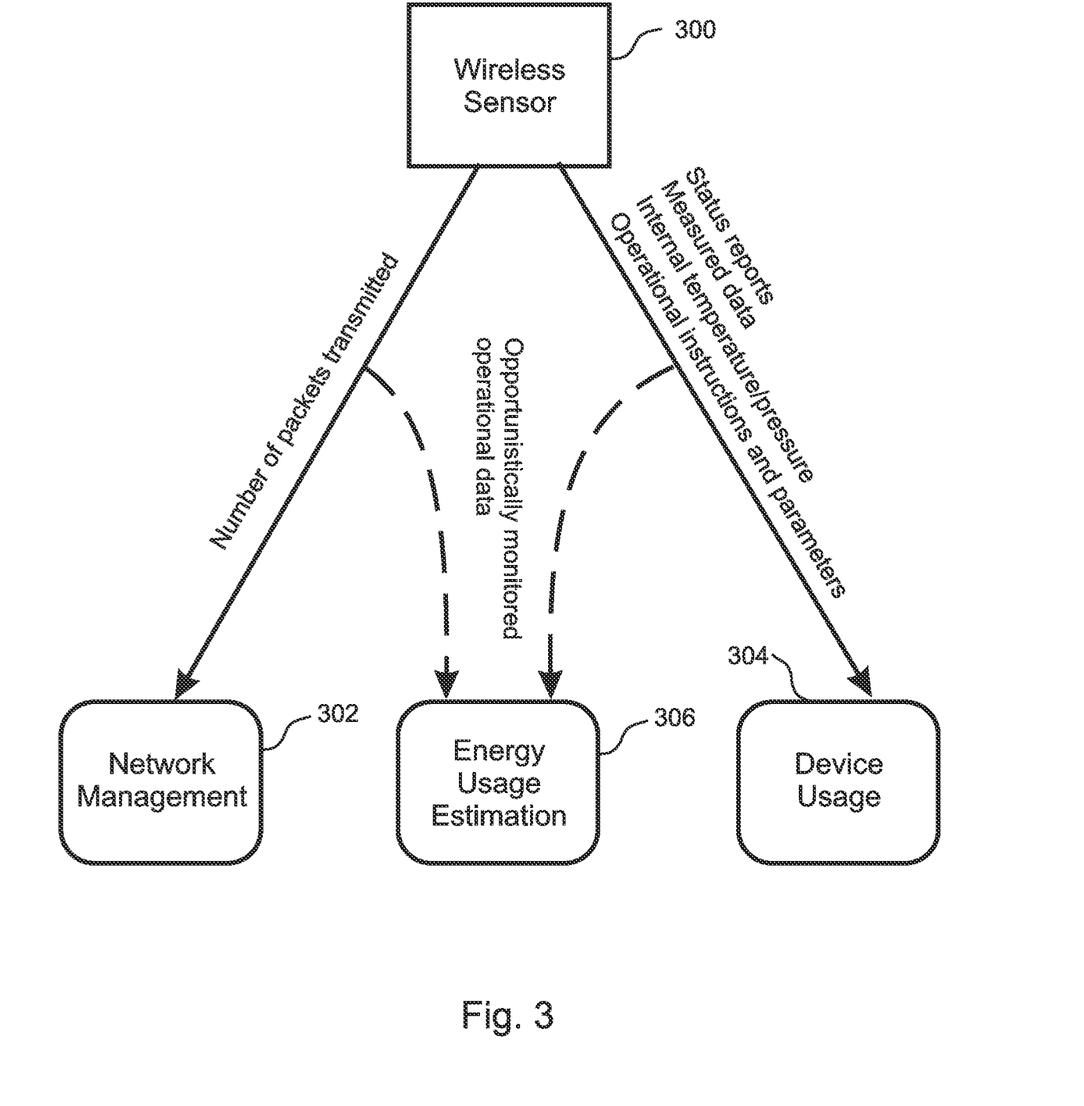
FIG. 3 is a block diagram that illustrates the opportunistic gathering of operational data that is obtained for other purposes unrelated to estimating battery usage.

For example, with reference to FIG. 3, it may be important for purposes of network management 302 to gather data pertaining to the number of packets transmitted by a device 300, so as to detect excessive packet collisions due to congestion and other network problems. This information is opportunistically used 306 in embodiments of the present invention to estimate the amount of energy that has been consumed by the device in sending the packets, including re-transmissions due to network collisions.

The monitored operational data can also include device usage information 304 that is gathered due to device monitoring and management activities that take place as the device 300 carries out its intended purpose. For example, it may be important to remotely monitor the active and sleep periods of a wireless sensor 300, because an increase in the frequency and/or durations of the active periods could indicate that an abnormality or degradation in the performance of a monitored apparatus has been detected, and is being closely monitored by the sensor 300. This information is opportunistically used 306, in embodiments, to estimate energy usage based on pre-characterized energy consumption during active and sleep periods.

During the operation of a wireless sensor 300, data will typically be transmitted by the sensor 300 to a receiving device. When there are message collisions, retransmission of messages may be executed by the transmitting wireless sensor. If the wireless sensor does not directly provide information regarding the number and durations of its active and sleep periods, embodiments estimate the durations and numbers of the active and sleep period based on this timing of this received data in combination with instructions and parameters that have been given to the wireless sensor 300, which will generally be known a priori.

In embodiments, the number of messages that are received by the receiving device from the sensor, together with the number of retransmissions, are logged and opportunistically reviewed to determine the total number of messages that have been transmitted by the sensor 300. This estimate, in combination with a pre-characterized amount of energy consumption per transmitted message, can then be used to estimate the total amount of energy that has been consumed by the message transmissions.

Other examples of monitored operational data include the total number of measurements made, and the total number of calculations performed, all of which can be derived from the sensor data reported that is reported to the receiving device by the wireless transmitting device.

As another example, the wireless device may be configured to measure and report its internal temperature and/or pressure as a means of monitoring the health and/or environment of the wireless device, and to anticipate and prevent damage to the device. In embodiments of the present method, these measured temperatures and/or pressures are included in the monitored operational data, and are used to further improve the accuracy of the estimated battery status.

To summarize, examples of opportunistically monitored operational data of a wirelessly linked device in various embodiments include, but are not limited to:

lengths of wake/sleep cycles;
lengths and number of active periods;
number and durations of dynamic electric current events during active periods;
number of messages transmitted during an active period;
frequency of sleep-to-wake cycles;
number of measurements made;
number of calculations performed;
internal and adjacent environmental temperature and/or pressure profile; and
transient behavior of the battery voltage during application and/or removal of a load.

Figure 4:
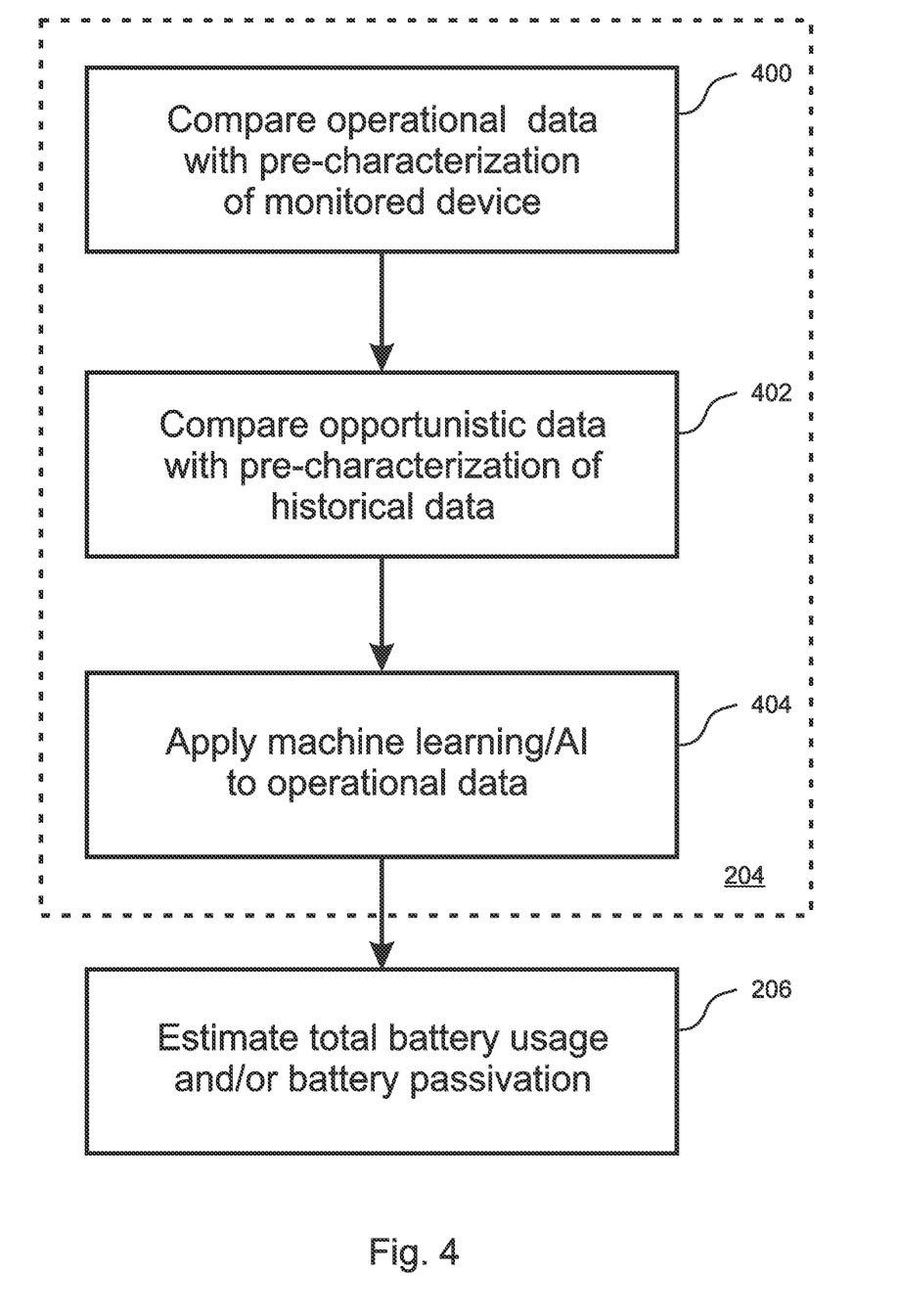
FIG. 4 is a flow diagram illustrating steps that are included in embodiments during analysis of the operational data.

According to the present invention, the operational data is then analyzed 204 with reference to the pre-characterized information. With reference to FIG. 4, this analysis 204 can include a direct comparison of the operational data with measured characteristics of the monitored device 400, comparison of the operational data with historic data 402 that was gathered and analyzed during the pre-characterization 200, and/or application of a statistical model and/or a machine learning/artificial intelligence to the operational data 404.

For example, during its training a machine learning algorithm may reveal a correlation or enhance performance of an existing correlation between environmental conditions, lengths of sleep periods, and passivation behavior of the battery in the historical data, and then apply that correlation or enhancement to help in predicting passivation behavior of the device that is currently being monitored.

As a result of the analysis 204 of the opportunistic operational data, the battery status, including the total energy usage of the battery, remaining battery life and/or the battery passivation can be estimated.

While some embodiments derive the power, battery life, and battery passivation estimates 206 solely based on the pre-characterized information 200 and monitored operational data 204, other embodiments further refine these estimates by implementing one or more simple, low cost and low-profile circuits in the device, such as a current measurement circuit, that is able to measure and report current flow, especially during dynamic current events.

In some embodiments a voltage senor is implemented in the device that monitors and reports the "start-up" load behavior of the battery voltage, i.e. the temporary drop in voltage and the recovery of the voltage that occurs immediately after the battery is subjected to a load at the beginning of an active period or during a dynamic current event such as a radio transmission. Similarly, in embodiments the device monitors and reports the behavior of the battery voltage when there is a sudden drop in energy consumption, for example due to a transition from an active period to a sleep period.

Figure 5:
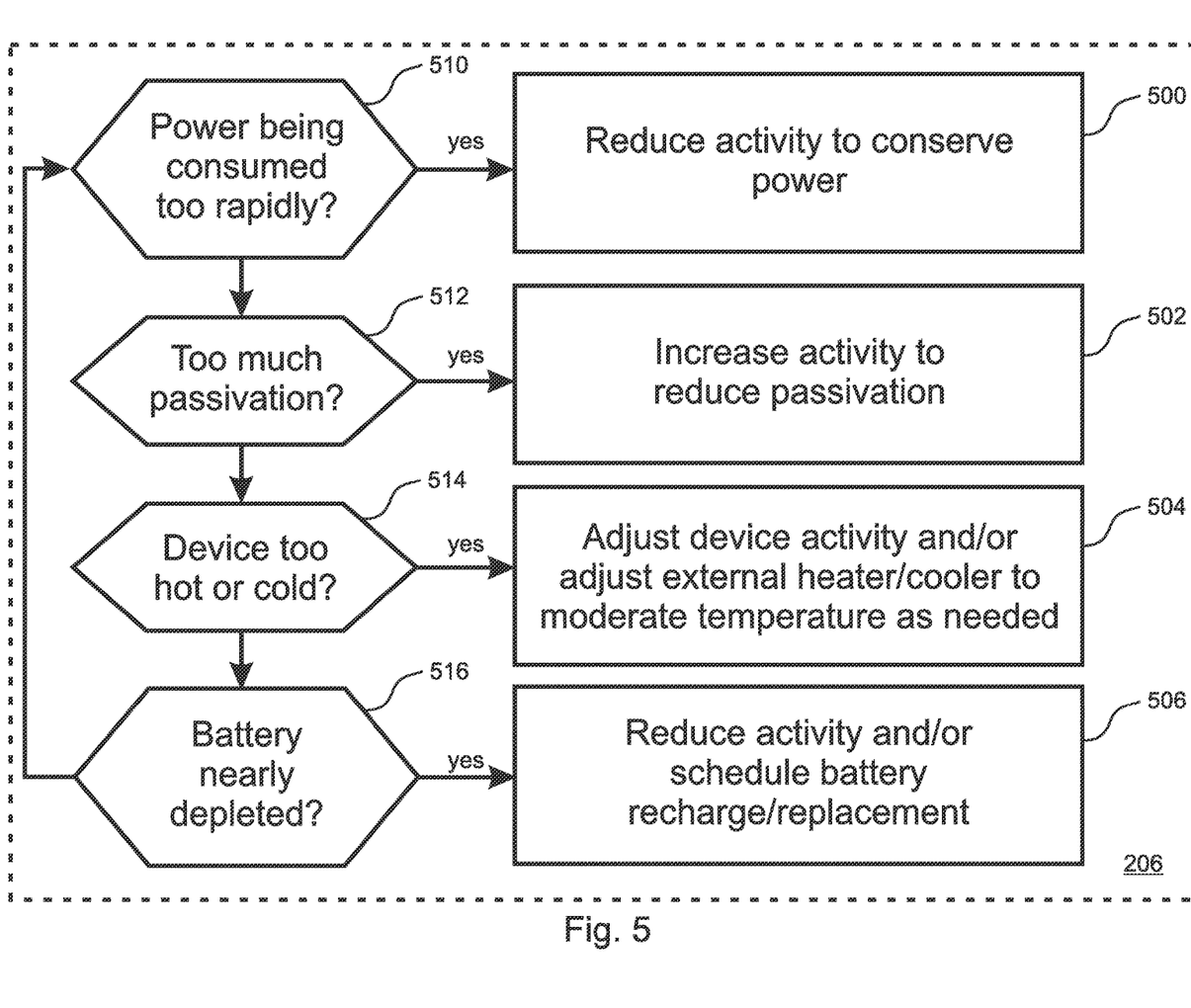
FIG. 5 is a flow diagram illustrating steps that are included in embodiments during battery management of the wireless device.

With reference to FIG. 5, the battery management 208 can include reducing the activity of the wireless device so as to increase battery life 500. For example, if excessive energy consumption is detected 510, the battery management 208 can include reducing the rate of battery consumption 500 by increasing the lengths of the sleep periods and/or reducing the number of dynamic current events that are required during each active period, for example by reducing the number of measurements and/or calculations that must be made and/or the quantity of data that must be transmitted.

Similarly, the battery management can include increasing the activity of the wireless device 502 in cases where un-managed passivation of a battery could shorten the battery life 512. For example, if energy is drawn from the battery too infrequently, this could allow a large passivation layer to accrue within the battery, and thereby cause the battery to fail to provide sufficient dynamic power to operate the device. In these embodiments, if an analysis of the pre-characterized and opportunistically monitored operational data indicates that current needs to be drawn from the battery more frequently 502, the battery management can include increasing the frequency of active periods and/or dynamic current events so as to reduce passivation.

In embodiments, if the device is becoming too cold or too hot 514, the battery management includes taking steps to prevent the temperature of the device from falling below a specified minimum or rising above a specified maximum 504, for example by increasing or decreasing the activity of the device to cause it to generate more or less heat, and/or adjusting an external temperature control device, such as a heater or cooler, that is in thermal communication with the device. By avoiding extremes of temperature, the device is thereby protected from component failure and/or from undue passivation.

The battery management can also include using the battery life estimates to determine if the battery is nearly depleted 516, and scheduling the recharging or replacement of the battery 506 comfortably, but not excessively, before its energy is exhausted.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the invention is not limited to just these forms, but is amenable to various changes and modifications. The disclosure presented herein does not explicitly disclose all possible combinations of features that fall within the scope of the invention. The features disclosed herein for the various embodiments can generally be interchanged and combined into any combinations that are not self-contradictory without departing from the scope of the invention. In particular, the limitations presented in dependent claims below can be combined with their corresponding independent claims in any number and in any order without departing from the scope of this disclosure, unless the dependent claims are logically incompatible with each other.

I claim:

1. A method of managing a remote, wireless device that is powered by a battery, the method comprising:
   A) obtaining pre-characterized information pertaining to the wireless device, wherein said pre-characterized information includes identifying substantially all of the operational phases and/or activities that are expected to characterize operation of the device once it is put in service, and determining a quantity of energy that is predicted to be drawn from the battery during each of said phases and/or activities;
   B) placing the wireless device in service;
   C) receiving operational data pertaining to actual phases and/or activities of the wireless device while it is in service, the receiving of said operational data being necessary for the device to perform its function, necessary for managing the device's performance of its function, and/or necessary for management of a wireless network over which the device communicates, said operational data being "opportunistic," in that it is obtained for purposes unrelated to battery management;
   D) while the wireless device is in service, analyzing the opportunistic operational data in light of the pre-characterized information;
   E) according to the analysis of step D), estimating a status of the battery, the estimated status including an estimated total energy consumed by the battery since it was last recharged or replaced;
   F) repeating steps C) through E) while the remote wireless device is in service; and
   G) recharging or replacing the battery when said estimated total energy consumed indicates that the battery is nearly exhausted.

2. The method of claim 1, wherein the remote wireless device is a remote wireless sensor.

3. The method of claim 1, wherein the remote wireless device is configured to cycle between at least one active mode and at least one sleep mode, and wherein the pre-characterized information includes, for each of the active and sleep modes, an energy usage profile of the active or sleep mode.

4. The method of claim 1, wherein the pre-characterized information includes energy usage associated with a dynamic current event during which a relatively high amount of current is drawn from the battery as compared to lower amounts of current that are drawn from the battery during most of the other operational phases and activities of the remote wireless device.

5. The method of claim 1, wherein the pre-characterized information includes at least one of:
   historical data regarding the wireless device;
   historical data regarding battery usage and/or behavior of similar or identical batteries and/or devices;
   information regarding an estimated total battery idle time that will elapse before the device is put into service; and
   after steps C) through E) have been performed at least once, combining information derived from any of steps C) through E) with the pre-characterized information.

6. The method of claim 1, wherein the method further comprises analyzing the pre-characterized information.

7. The method of claim 6, wherein the pre-characterized information includes historical data regarding the wireless device, and wherein step D) includes at least one of:
   developing a statistical model of battery life according to the historical data;
   developing a statistical model of battery passivation according to the historical data; and
   using the historical data to train a machine learning/artificial intelligence algorithm.

8. The method of claim 7, wherein at least one of the statistical model of battery life, the statistical model of battery passivation, and the training of the machine learning/artificial intelligence is periodically or continuously updated after step B) in light of the opportunistic operational data.

9. The method of claim 7, wherein step E) includes applying at least one of the statistical model and the machine leaning/artificial intelligence algorithm to the opportunistic operational data.

10. The method of claim 1, wherein the opportunistic operational data includes durations and numbers of active and sleep periods entered by the remote wireless device.

11. The method of claim 1, wherein the opportunistic operational data includes a number of dynamic current events that have occurred.

12. The method of claim 11, wherein the dynamic current events include wireless transmissions by the remote wireless device.

13. The method of claim 11, wherein the remote wireless device is a wireless sensor, and wherein the dynamic current events include measurements made by the wireless sensor and/or calculations performed by the wireless sensor.

14. The method of claim 1, wherein the opportunistic operational data includes a quantity of information wirelessly retransmitted by the remote wireless device.

15. The method of claim 1, wherein at least some of the opportunistic operational data is obtained in support of management of the network.

16. The method of claim 1, wherein at least some of the opportunistic operational data is obtained due to remote management of the wireless device.

17. The method of claim 1, wherein the remote wireless device is a remote wireless sensor, and wherein at least some of the opportunistic operational data is obtained due to reporting by the remote wireless sensor of data that it has sensed.

18. The method of claim 1, wherein the opportunistic operational data further includes environmental information pertaining to at least one of an interior of the remote wireless device and an immediate environment of the remote wireless device.

19. The method of claim 1, wherein estimating the total energy consumed by the battery since it was last recharged or replaced is further according to current measurement data obtained by a current measuring circuit included in the remote wireless device.

20. The method of claim 1, wherein estimating the status of the battery further includes analyzing transient behavior of the battery voltage during application and/or removal of a load according to transient voltage measurements obtained by a voltage measuring circuit included in the remote wireless device.

21. The method of claim 1, wherein the estimated status of the battery further includes an estimate of a degree of passivation of the battery.

22. The method of claim 1, wherein the battery management action of step G) further includes at least one of:
- decreasing a degree of device activity so as to reduce energy consumption of the device;
- increasing the degree of device activity so as to reduce passivation of the battery;
- increasing the degree of device activity so as to avoid excessive cooling of the battery;
- decreasing the degree of device activity so as to avoid excessive heating of the battery; and
- adjusting a temperature control device that is proximate but independent of the wireless device so as to avoid excessive cooling or heating of the battery.

* * * * *